(12) United States Patent
Smithies et al.

(10) Patent No.: US 8,262,780 B2
(45) Date of Patent: Sep. 11, 2012

(54) HIGH PERFORMANCE GAS TURBINE INLET FILTER (HEPA) USING MEMBRANE MEDIA

(75) Inventors: Alan Smithies, Overland Park, KS (US); Jack T. Clements, Lee's Summit, MO (US); Cynthia Polizzi, Lee's Summit, MO (US)

(73) Assignee: BHA Group, Inc, Kansas City, MO (US)

(*) Notice: Subject to any disclaimer, the term of this patent is extended or adjusted under 35 U.S.C. 154(b) by 490 days.

(21) Appl. No.: 12/507,334

(22) Filed: Jul. 22, 2009

(65) Prior Publication Data

US 2011/0016838 A1  Jan. 27, 2011

(51) Int. Cl.
*B01D 53/22* (2006.01)
*B01D 39/16* (2006.01)
*B01D 46/52* (2006.01)
*B32B 37/04* (2006.01)

(52) U.S. Cl. .................. 96/12; 96/11; 55/487; 55/498; 55/521; 55/527; 55/528; 95/273; 156/181

(58) Field of Classification Search .............. 96/4, 11, 96/12; 55/486, 487, 498, 521, 524, 527, 55/528; 95/273; 156/60, 181
See application file for complete search history.

(56) References Cited

U.S. PATENT DOCUMENTS

| | | | |
|---|---|---|---|
| 6,149,702 A * | 11/2000 | Kawano et al. | 55/497 |
| 6,336,948 B1 * | 1/2002 | Inoue et al. | 55/486 |
| 6,409,787 B1 * | 6/2002 | Smithies et al. | 55/528 |
| 7,309,372 B2 | 12/2007 | Kahlbaugh et al. | |
| 7,316,723 B2 | 1/2008 | Chung et al. | |
| 2008/0217241 A1 | 9/2008 | Smithies et al. | |
| 2008/0245041 A1 * | 10/2008 | Choi | 55/524 |
| 2008/0314010 A1 * | 12/2008 | Smithies et al. | 55/498 |
| 2008/0314011 A1 | 12/2008 | Smithies et al. | |
| 2008/0315464 A1 | 12/2008 | Smithies et al. | |
| 2008/0315465 A1 | 12/2008 | Smithies et al. | |
| 2009/0071114 A1 | 3/2009 | Smithies | |
| 2010/0218471 A1 * | 9/2010 | Smithies et al. | 55/486 |

FOREIGN PATENT DOCUMENTS

EP  1674144 A1  6/2006

OTHER PUBLICATIONS

U.S. Appl. No. 12/384,320, filed Feb. 27, 2009.

* cited by examiner

*Primary Examiner* — Jason M Greene
(74) *Attorney, Agent, or Firm* — Pearne & Gordon LLP

(57) ABSTRACT

A composite filter media structure and an associated method of making are provided. The structure includes a base substrate that includes a nonwoven fabric substrate formed from a plurality of bicomponent synthetic fibers using a spunbond process. The composite filter media structure includes a surface layer deposited on one side of the base substrate where a thermal lamination process can be used to combine the base substrate and the surface layer. The surface layer is formed from a microporous expanded polytetrafluoroethylene membrane. In one aspect, the base substrate and the surface layer are configured to provide greater than 95% and equal to or less than 99.5% filtration efficiency measured in accordance with an EN 1822 test method. In another aspect, the filter media includes an embossing pattern or a plurality of corrugations formed using opposing rollers at a temperature of about 90° C. to about 140° C.

17 Claims, 9 Drawing Sheets

HIGH PERFORMANCE GAS TURBINE INLET FILTER (HEPA) USING MEMBRANE MEDIA

BACKGROUND OF THE INVENTION

1. Field of the Invention

The invention relates generally to a filter element, and more particularly to a filter element having a corrugated or embossed composite nonwoven filter media.

2. Discussion of the Prior Art

Some known filter media composite constructs incorporate a wet-laid paper making process to produce the substrate, and an electro-spun technology to deposit a lightweight nanofiber coating on one or both sides of the filter media substrate. Typically the media substrate has a basis weight of 100-120 grams per square meter ($g/m^2$), and the nanofiber layer has a basis weight of 0.5 $g/m^2$ or less.

It is known that a media can have three layers that include a base media, an expanded polytetrafluoroethylene (ePTFE) membrane, and a third layer that is an electrically charged nonwoven meltblown layer. However, the electrically charged nonwoven meltblown layer is known to reduce in performance significantly when exposed to moist environments and the electro-static charge diminishes quickly. This known media has not been approved to meet the strict industry test protocols needed for pulsed Gas Turbine Inlet Filtration.

HEPA media with a wet laid glass based media can be found in static Gas Turbine filtration where it is found to be functionally satisfactory for non-pulsed Gas Turbine Inlet Filtration. The wet laid glass based media may be unsuitable for use in pulsed filtration due to its inherent weak strength properties that cannot withstand the stresses of high pressure pulse air cleaning. The weak strength properties would result in the media being torn apart from itself if used in high pressure pulse air cleaning applications.

Filter media composite constructs may be used to provide for clean air provision to various devices. Such devices may include turbine blades. Typical, known filter media may have a new or clean operating efficiency providing for around 55% of capture of 0.3-0.4 μm particles, at a pressure drop typically greater than 7.0 mm H2O, when tested in accordance with the ASHRAE 52.2-2007 test procedure at the known operating flow rate.

Turning to an example device that contains turbine blades, it is logical to try to maintain the turbine blades clean. Fouling and erosion of turbine blades has been known to decrease power output of turbines and increase the frequency of outages to repair the blades. One current procedure for cleaning turbine blades requires taking the turbine off-line at periodic intervals to water wash the blades clean. Turbine down time may be expensive because the turbine is not operating and therefore, power generation is curtailed. It would be desirable to provide a higher efficiency filter media than the known filter media to reduce or eliminate turbine down time to clean the turbine blades.

The best in performance of current technology is rated per ASHRAE 52.2 at F-9, using standard wet laid base media coated with an electrospun fiber surface layer. To date the maximum efficiencies have been limited by the electrospinning process to around a maximum of 75% efficiency when challenged with 100% 0.30 micron DOP particles. This has been achieved with either heavy layers of elecrospun fibers on one surface of a wet laid base media or the use of a nanofiber layer on both surfaces of the base media.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a composite filter media structure that includes a base substrate. The base substrate includes a nonwoven fabric substrate formed from a plurality of bicomponent synthetic fibers using a spunbond process. The composite filter media structure includes a surface layer deposited on one side of the base where the surface layer is formed from a microporous expanded polytetrafluoroethylene membrane. The base substrate and the surface layer are configured to provide greater than 95% and equal to or less than 99.5% filtration efficiency measured in accordance with an EN 1822 test method.

In accordance with another aspect, the present invention provides a composite filter media structure that includes a gas turbine air inlet filter element. The gas turbine air inlet filter element includes a first end cap, a second end cap, and a filter media. The filter media includes a nonwoven fabric formed from a plurality of bicomponent synthetic fibers with a spunbond process and a surface layer deposited on one side of the base substrate. The surface layer is formed from a microporous expanded polytetrafluoroethylene membrane. The base substrate and the surface layer are configured to provide greater than 95% and equal to or less than 99.5% filtration efficiency measured in accordance with an EN 1822 test method. The filter media further includes an embossing pattern or a plurality of corrugations, said embossing pattern or said corrugations formed using opposing rollers at a temperature of about 90° C. to about 140° C.

In accordance with yet another aspect, the present invention provides a method of making a composite filter media. The method includes forming a nonwoven fabric substrate formed from a plurality of bicomponent synthetic fibers using a spunbond process. The method including applying a surface layer by thermal lamination to melt the synthetic in to the surface layer to form the composite filter media such that the composite filter media has a filtration efficiency of greater than 95% and equal to or less than 99.5%.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
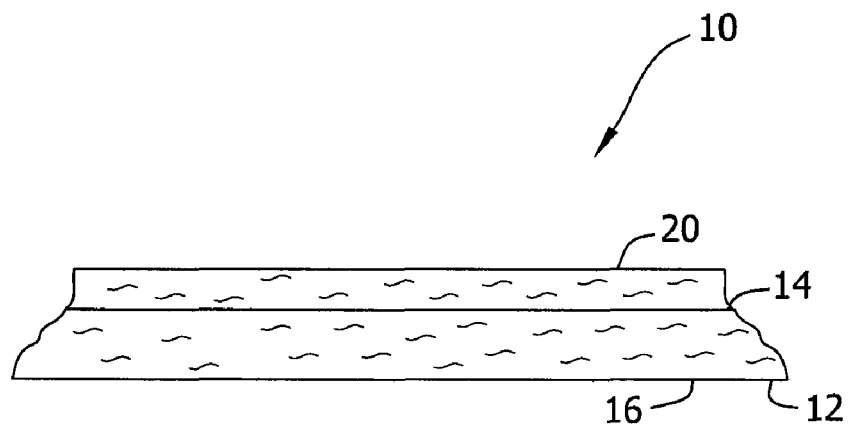
FIG. 1 is cross sectional illustration of an example aspect of a composite filter media.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Examples of a high performance composite filter media and a method of making the composite filter media in accordance with one or more aspects of the present invention are described in detail below. In general, the composite filter media includes a bicomponent synthetic nonwoven base substrate and at least one surface layer. In one specific example, such composite filter media provides enhanced filtration performance when configured into a filter element or cartridge and used in a pulsed, gas turbine inlet filter housing or similar industrial filtration system. Also, in one example the new composite filter media may be configured into a filter cartridge or filter element with subsequent processes such as corrugating and pleating and general assembly. Corrugating the filter media provides a large volume of passageways for low restriction air flow on both the "clean" and "dirty" sides of the composite filter media. In one example, the composite filter media may provide an initial filtration efficiency of greater than 95% and equal to or less than 99.5% retained capture of 0.3-1.25 μm particles, when tested in accordance with the American Society of Heating, Refrigerating and Air-Conditioning Engineers (ASHRAE) 52.2 test procedure, which is about a 14.5% increase in performance compared to known filter media. In addition, the composite media may provide greater than 95% and equal to or less than 99.5% efficiency at a lower pressure drop than known filter media. In one example, the composite filter media has a resistance (or pressure drop) of between approximately 0.60 inches of water and 3.05 inches of water.

Also, the composite filter media may have a beneficial durability when exposed to extensive and intensive dust loading and cleaning challenges and achieves a higher efficiency. Such beneficial durability may be an improvement over existing technology. One reason for the improved performance (e.g., greater than 95% and equal to or less than 99.5% efficiency) may be that the fibers are mechanically anchored in the pores of the membrane due to the heat and pressure applied during the thermal lamination process.

FIG. 1 shows one example of a composite filter media 10 in accordance with at least one aspect of the present invention in the form of a base substrate 12 formed by a spunbond process in combination with a surface layer 20. One aspect of the invention is that the substrate 12 is a nonwoven fabric substrate formed from a plurality of bicomponent synthetic fibers using a spunbond process. Such an aspect for provision of bicomponent fibers may be via a core-sheath structure, an island structure, or a side-by-side structure.

Any suitable bicomponent synthetic fiber can be used to make the nonwoven fabric of media substrate 12. Suitable materials for the core and the sheath of the bicomponent fiber include, but are not limited to, polyester, polyamid, polyolefin, thermoplastic polyurethane, polyetherimide, polyphenyl ether, polyphenylene sulfide, polysulfone, aramid, and mixtures thereof. Suitable materials for the sheath of the bicomponent fiber include thermoplastic materials that have a lower melting point than the material of the core of the bi-component fiber, for example polyester, polyamid, polyolefin, thermoplastic polyurethane, polyetherimide, polyphenyl ether, polyphenylene sulfide, polysulfone, aramid, and mixtures thereof. In one example, the bicomponent fibers can have various diameters.

The bicomponent fibers are meltspun through jets into a plurality of continuous fibers which are uniformly deposited into a random three dimensional web. The web can then be heated and embossed by a calendar roll which thermally bonds the web into a consolidated spunbond fabric. Heat from contact of the calendar roll embossing pattern softens or melts the thermoplastic sheath of bicomponent fibers which binds the nonwoven fibers together only at the contact points of calendar roll embossing pattern. The temperature is selected so that at least softening or fusing of the lower melting point sheath portion of bicomponent fibers occurs. In one embodiment, the temperature is about 90° C. to about 240° C. The desired connection of the fibers is caused by the melting and re-solidification of the sheath portion after cooling.

FIG. 1 is a schematic, sectional illustration of the composite filter media 10 to show the sheet-like construction of a specific example. As can be appreciated, the filter media 10 includes the base media substrate 12 and the surface layer 20. The base media substrate 12 has a first side 14 and a second side 16. In one aspect, the surface layer 20 is deposited onto the first side 14 of the media substrate 12. Although not explicitly shown in an example illustration, it is to be appreciated that the surface layer 20 could be deposited onto the second side 16 or that the surface layer 20 could be deposited on each of first and second sides 14 and 16.

The filtration surface layer 20 for the HEPA media is made from an expanded micro porous polytetrafluoroethylene (ePTFE) membrane. This membrane is specially designed and produced for this application. The membrane properties in one example aspect have a basis weight of 0.01 to 10.0 g/m$^2$, in another aspect around 2.0-3.5 g/m$^2$. The thickness of the surface layer 20 can range from 5 to 25 microns but in another aspect the thickness can be approximately 10-12 microns. The air permeability of the surface layer 20, before a lamination process is performed, can range from 1.0 to 50 cubic feet per minute (cfm) at 0.5" of water pressure, but in another aspect is around 9-12 cfm at 0.5" water pressure.

The membrane of the surface layer 20 is thermally laminated via a heat and pressure process to melt the polyester fibers of the base substrate 12 in to the microporous membrane of the surface layer 20. During lamination, the membrane of the surface layer 20 becomes fixed to the base substrate 12 and rendered durable for the rigors of further processing and the end use application as a composite media. During the lamination process, the air permeability property of the membrane of the surface layer 20 changes as the air permeability of the membrane of the surface layer 20 is reduced by the melting of the fibers into the surface layer 20. The mechanical anchoring of the thermoplastic polyester fibers in to the pores of the membrane in the surface layer 20 blocks off air flow with a resultant air permeability of the composite laminate being reduced to around 4-10 cfm at approximately 0.5 inches of water pressure.

After the surface layer 20 has been laminated on the base substrate 12, the combination of the surface layer 20 and the base substrate 12 provides for a durable three dimensional surface filtration layer, which has an extensive multi-layer tortuous path that permits high efficiency and fine particle capture without substantially restricting air flow or increasing pressure drop. The multi-layer tortuous path may include small pores. Such structure has been found to be extremely durable against the mechanical forces in a pulsed filtration system, especially in comparison to a two dimensional nanofiber layer with minimal thickness. The base substrate 12 and the membrane of the surface layer 20 combine to attain the HEPA filtration efficiency performance for an average most penetrating particle size of approximately 0.5-1.25 microns. Based upon the multi layer tortuous path of the membrane pore structure combined with the base substrate 12, greater than 95% and equal to or less than 99.5% filtration efficiency is achieved in one example for 0.3 micron particles at an air flow rate of 5.33 cm/sec or 10.5 ft./min.

The media may also provide for lower pressure drop build-up because of less deflection of the filter media from the forces exerted on the filter media during the filtering and reverse cleaning operations. Also, the spunbond corrugated media substrate 12 may be more efficient than known filter media substrates at an equivalent or lower pressure drop. The spunbond media 12 provides bonding to consolidate fibers into a fabric or fabric substrate. In one aspect, the bicomponent fibers used to form the media substrate 12 can be finer than fibers used to form known filter media. In addition, the adherence bond between the base media substrate 12 and the surface layer 20 may be enhanced due to additional thermal processing during a corrugating or embossing operation.

Figure 2:
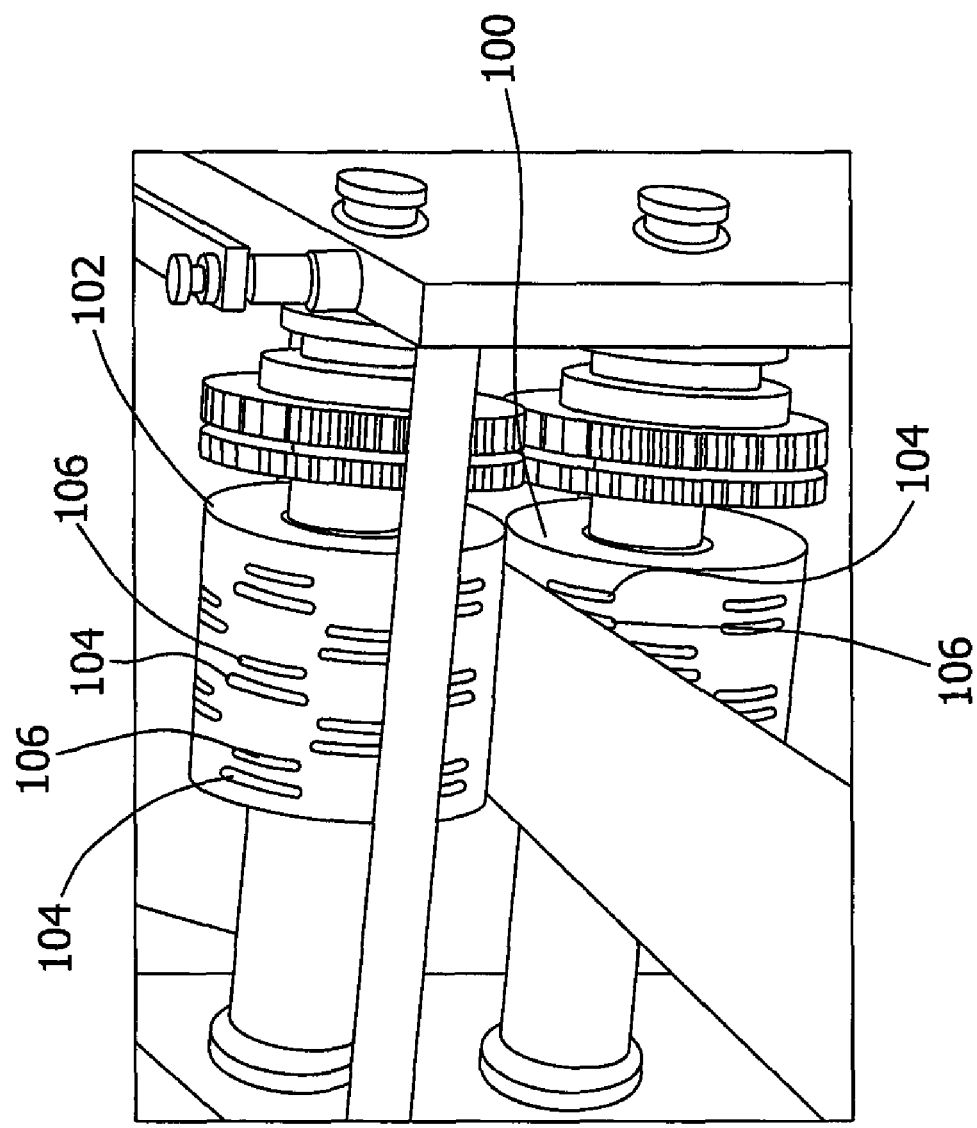
FIG. 2 is a schematic illustration of embossing rollers in accordance with an example aspect.

FIG. 2 is a schematic illustration of an example device with lower and upper embossing rollers 100, 102 for the embossing process. As will be appreciated there, the rollers 100, 102 have a plurality of structures that mate with the base substrate 12 there between to apply localized heat and pressure. In the shown example, the rollers 100, 102 have a plurality rib 104 and channel 106 pairs that are located at an outer surface 108 of lower and upper embossing rollers 100 and 102. Each rib 104 and each channel 106 extend along a portion of the circumference of embossing roller 100 or 102. Also, each pair of a rib 104 and a channel 106 on the lower embossing roller 100 is aligned with a corresponding pair of a rib 104 and a channel 106 on the upper embossing roller 102 with the ribs and channels arranged so that each rib 104 on the lower roller 100 is aligned with and mates with a channel 106 on the upper roller 102, and each rib 104 on the upper roller 102 is aligned with and mates with a channel 106 on the lower roller 100. The plurality of pairs of ribs 104 and channels 106 are spaced apart across the embossing rollers 100 and 102 in staggered rows which define an example embossing pattern.

One aspect of the present invention is a unique bond pattern of the base media substrate 12. The bond pattern can be defined by an embossing pattern of the calendar rolls, shown in FIG. 2. The bond area provides for media durability and function while at the same time the bond points create areas of fused polymer that have zero air flow. The custom bond pattern may aid in improving the filtration efficiency of the composite filter media structure.

Figure 3:
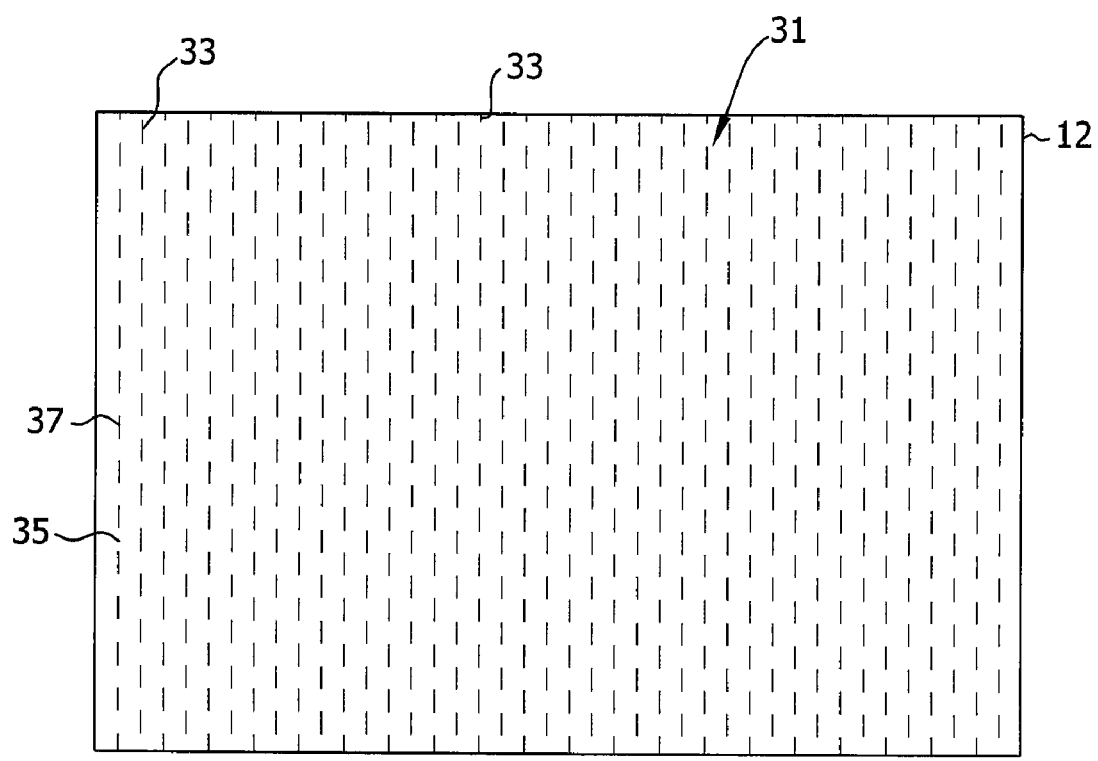
FIG. 3 is a top illustration of a bond pattern of the base media substrate shown in FIG. 1.

An example bond area pattern 31 for the base substrate 12 is shown in FIG. 3. The pattern has a plurality of substantially parallel discontinuous lines 33 of bond area to bond the bicomponent fibers together to form the nonwoven fabric base substrate 12. The discontinuous lines 33 of the bond pattern 31 may be made in a direction parallel to a machine direction (longitudinal extent) of base media substrate 12. The parallel discontinuous lines 33 of the bond area are offset from each other so that there are locations 35 where there are no bond areas. The locations 35 without a bond area can be aligned with a bond area 37 of an adjacent discontinuous line 33. In one example, the bond area 37 of spunbond bicomponent fibers in the media substrate 12 is about 10 percent to about 16 percent of the total area of the fabric. It is worth noting that some known spunbond fabrics may have a bond area of about 19 to 24 percent. A lower bond areas allows for the base media 12 to have an increase in air permeability or inversely low pressure drop at a given air flow. In one embodiment, the basis weight of the nonwoven synthetic fabric base media 12 is about 100 g/m$^2$ to about 330 g/m$^2$, and in another embodiment, about 150 g/m$^2$ to about 260 g/m$^2$.

The surface layer 20 may be applied, such as by the lamination process, directly on at least one side of the base substrate 12 to form the composite filter media 10. The resultant composite filter media has a minimum filtration efficiency of greater than 95% and equal to or less than 99.5%. The media 10 has a relatively high air permeability compared to known filter media which permits improved mechanical adhesion of the fibers of the membrane of the surface layer to the bicomponent fibers in the base media.

At this point, a complete and useful composite filter media 10 is provided. However, as mentioned, further processing may be performed upon the composite filter media. As one example, the composite filter media 10 can be corrugated using opposing corrugating rollers at a temperature of about 90° C. to about 140° C. In an alternate embodiment, the composite filter media 10 can be embossed using opposing embossing rollers at a temperature of about 90° C. to about 140° C.

Figure 4:
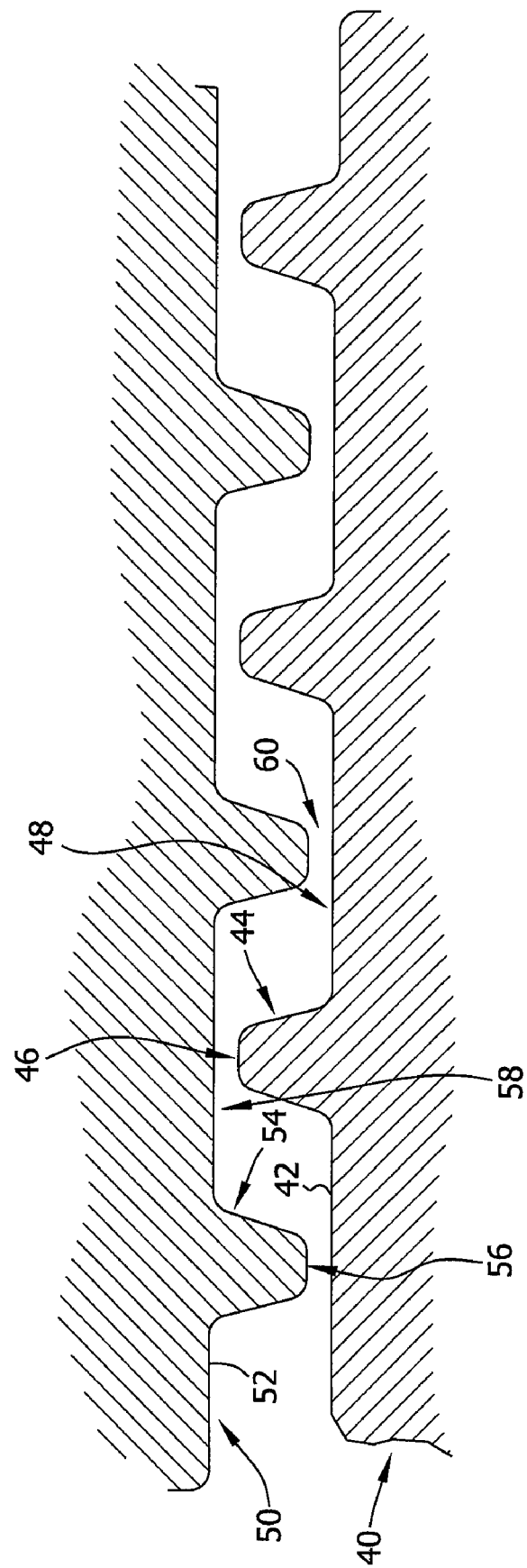
FIG. 4 is a cross sectional illustration of corrugation rollers in accordance with an example aspect.

As shown in FIG. 4, opposing profiled corrugating rolls produce a uniform corrugation over the entire cross-section of filter media 10. A lower corrugating roller 40 includes an outer surface 42 having a plurality of substantially V shaped ribs 44 extending circumferentially around lower roller 40. Ribs 44 are substantially evenly spaced apart along the width of outer surface 42 of lower roller 40 so that outer surface 42 has a plurality of peaks 46 and valleys 48. An upper corrugating roller 50 includes an outer surface 52 having a plurality of substantially V-shaped ribs 54 extending circumferentially around upper roller 50. Ribs 54 are substantially evenly spaced apart along the width of outer surface 52 of upper roller 50 so that outer surface 52 has a plurality of peaks 56 and valleys 58. Ribs 44 of lower roller 40 are aligned with valleys 58 of upper roller 50 and ribs 54 of upper roller 50 are aligned with valleys 48 of lower roller 40. The width of ribs 44 and 54 can be any suitable width up to the width of opposing valleys 48 and 58 of lower and upper rollers 40 and 50. A space 60 between ribs 44 and 54 and valleys 48 and 58 respectively define a nip between lower and upper rollers 40 and 50. The nip is less than the thickness of filter media 10 which consolidates filter media 10 when passed between ribs 44 and 54 and respective valleys 48 and 58. The consolidation of filter media 10 at the nip sets corrugations 18 into filter media 10. In operation, the temperature of corrugating rollers 40 and 50 is about 90° C. to about 140° C.

Figure 5:
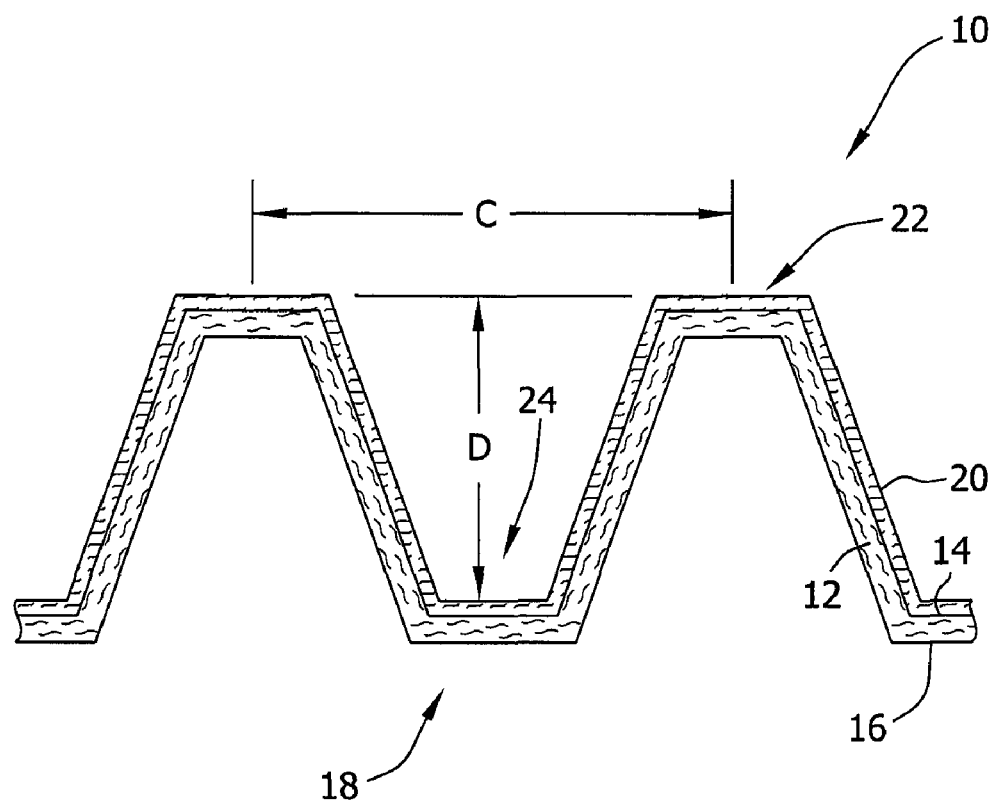
FIG. 5 is cross sectional illustration of an example aspect of the composite filter media shown in FIG. 1 after corrugating.

Referring also to FIG. 5, an example of corrugations 18 that can be formed, such as by the corrugating rolls of FIG. 4, is shown. These example corrugations 18 are configured as an alternating up and down substantially V-shaped wave in composite filter media 10. Wave crests 22 and troughs 24 extend in the direction of travel of the web of substrate through the forming equipment. Troughs 24 can have an effective depth D of at least about 0.02 inch (0.5 mm) to permit breathability of filter media 10 at high dust loading to maintain low differential pressure, below about 4 inches water column (wc). A corrugation pitch C in the example aspect is about 3 to about 10 corrugations per inch (about 1.2 to about 3.9 corrugations per cm), and in another aspect, from about 3 to about 6 corrugations per inch (about 1.2 to about 2.4 corrugations per cm). The combination of effective depth D and corrugation pitch C help provide improved touch points which help prevent pleat collapse under high static pressure from high air velocities and dust loadings. A uniform corrugation over the entire cross-section of the filter media 10 can also be provided.

Figure 6:
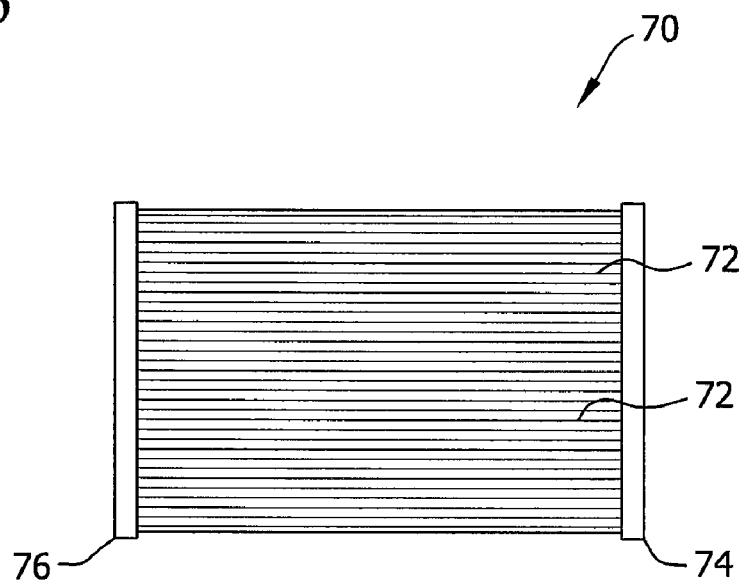
FIG. 6 is a side illustration of a filter cartridge that includes the filter media shown in FIG. 2.
Figure 8:
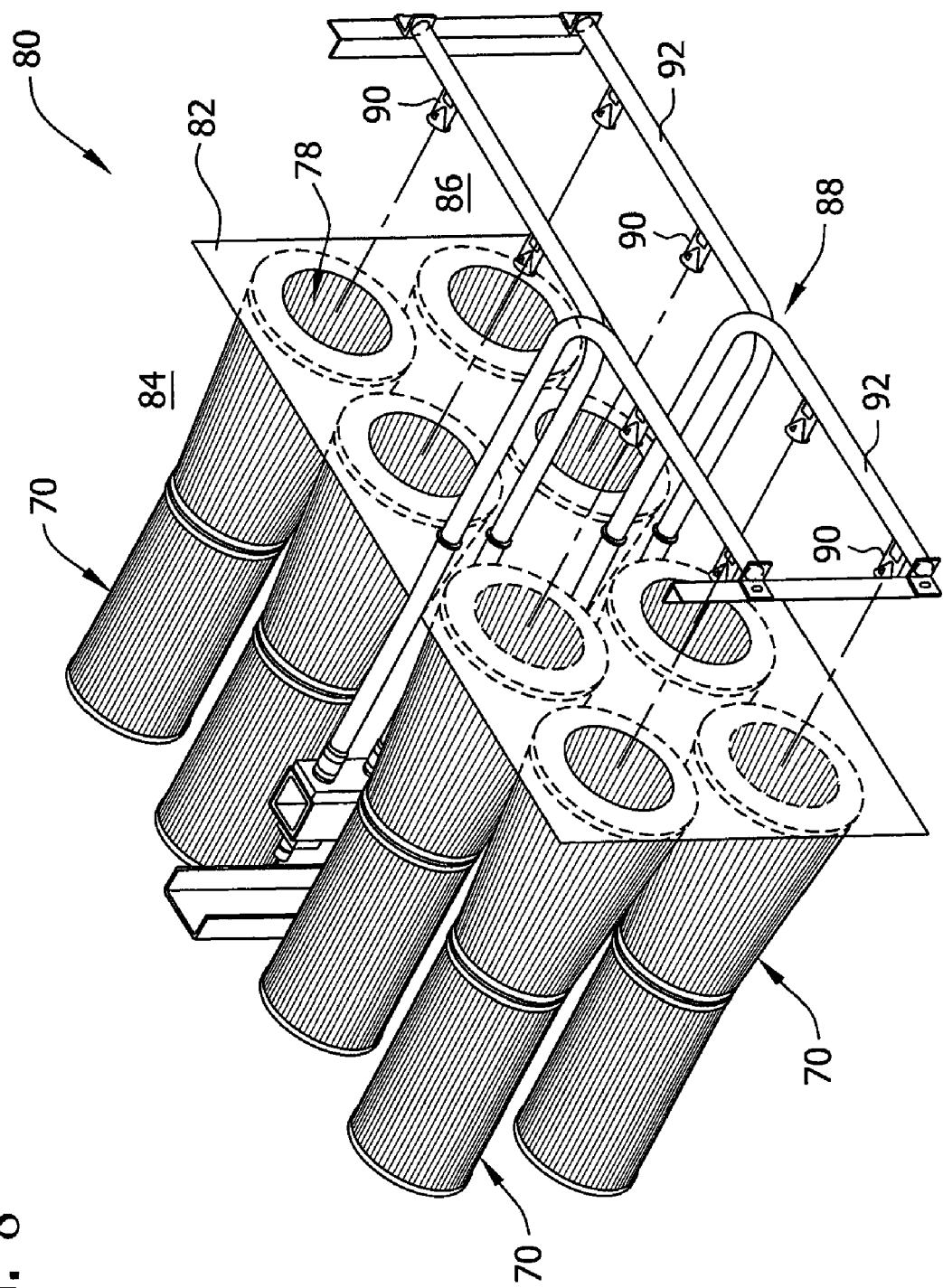
FIG. 8 is a perspective illustration of a filter assembly that includes the filter cartridge shown in FIG. 6.

FIG. 6 is a side illustration of an example filter element 70 formed from the corrugations filter media 10. The filter element 70 includes a first end cap 74 and an opposing second end cap 76 with filter media 10 extending between end caps 74 and 76. The filter element 70 has a tubular shape with an interior conduit 78 (FIG. 8). It is appreciated that other shapes for the filter element 70 can also be provided.

Figure 7:
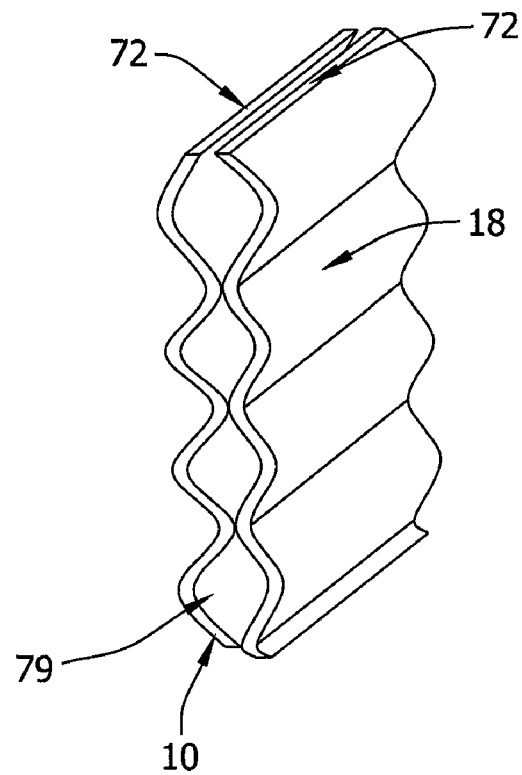
FIG. 7 is an enlarged perspective illustration of a portion of the filter cartridge shown in FIG. 6.

As yet another example, FIG. 7 shows an arrangement in which two portions of filter media 10 are adjacently positioned. Corrugations 18 in adjacent pleats 72 of filter element 70 define oval tubes 79 for air flow. The corrugations 18 extend substantially perpendicular to the edges of pleats 72.

FIG. 8 is a perspective illustration of a filter assembly 80 that includes a plurality of filter elements 70 mounted to a tube sheet 82 in pairs in an end to end relationship. Tube sheet 82 separates the dirty air side 84 from the clean air side 86 of filter assembly 80. A cleaning system 88 for cleaning filter elements 70 with pulsed air includes a plurality of air nozzles 90 mounted to air supply pipes 92. Pulses of compressed air directed into interior conduit 78 of filter elements 70 are used to clean filter elements 70 of collected dirt and dust. As shown in FIG. 8, the filter element 70 can have a tubular shape with an interior conduit 78. Filter element 70 is cylindrical in shape, but can also be conical or have a variety of other shapes. The filter element 70 can also include an inner and/or an outer support liner to provide structural integrity of filter element 70 and/or support for filter media 10. Other components can also be provided as part of the filter element 70 along with the filter media 10. For example, internal and external perforated metal cages, urethane potting compounds, and urethane strapping compounds can all be provided.

Filter elements that include aspects in accordance with the present invention can be used in gas turbine inlet filtration systems. Of course, other systems may employ filter elements that include aspects in accordance with the present invention. In addition, a cleaning system can be connected to at least one filter element to direct air into the filter elements for cleaning purposes to remove dirt and dust.

Figure 9:
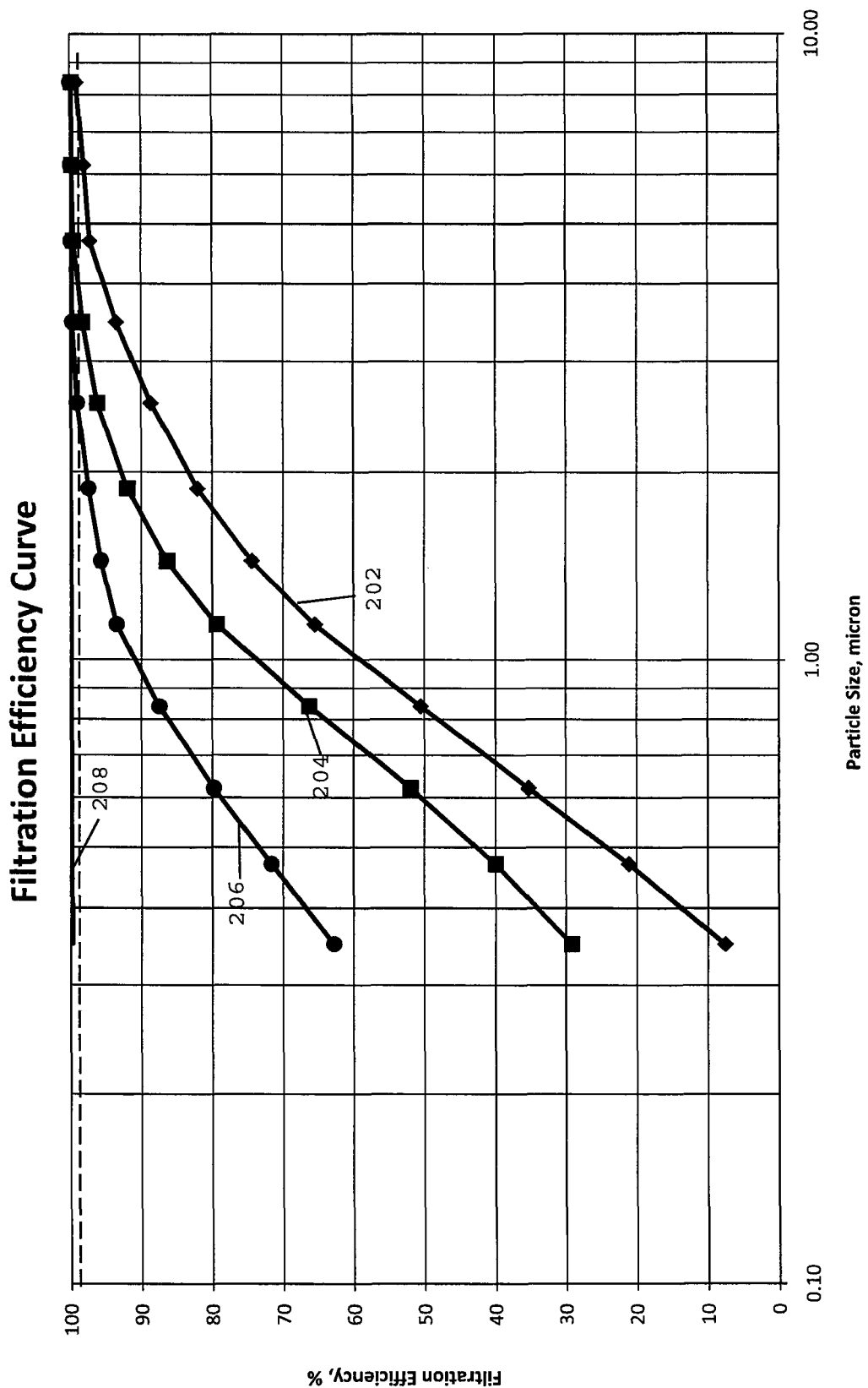
FIG. 9 is a graph of filtration efficiency versus particle size of various media in comparison with an example of FIG. 1.

The filtration efficiency of four different medias, including an example of the subject invention, were compared in a filtration efficiency test in accordance with ASHRAE 52.2-2007 test method, as shown in the graph of FIG. 9. The data for FIG. 9 is based on Chart 1. The medias that are compared are (1) a standard 80/20 cellulose blend, (2) a standard synthetic, (3) a standard synthetic nanomedia, and (4) an example of the subject invention. Line 202 represents the standard 80/20 cellulose blend including an 80% cellulose and a 20% polyester blend. Line 204 represents the standard synthetic, which refers to a wet-laid synthetic. Line 206 represents the standard synthetic nanomedia which refers to a wet-laid synthetic with a basis weight of less than 0.5 g/m² and a single-layer nanofiber layer that has a thickness of less than 0.5 microns. Line 208 represents an example of the subject invention with the surface layer 20 formed from a microporous ePFTE membrane. The data shown illustrates that line 208 filters submicron particulates better than other medias commonly used in industry at a large range of particle sizes, especially as smaller particle sizes are being tested. The other examples only reach an increased filtration efficiency level but only at larger particles sizes, as opposed to the most penetrating particle size. In addition, as shown in chart 1, the invention still has improved performance over the entire range of particle sizes.

CHART 1

Filtration Efficiencies based on Particle Size

| Particle Size | Standard 80/20 Cellulose Blend (202) | Standard Synthetic (204) | Standard Synthetic Nanomedia (206) | Invention (208) |
|---|---|---|---|---|
| 0.35 | 7.60 | 38.00 | 62.80 | 99.70 |
| 0.47 | 21.10 | 46.50 | 71.67 | 99.80 |
| 0.62 | 35.30 | 54.70 | 79.80 | 99.90 |
| 0.84 | 50.50 | 63.00 | 87.48 | 99.90 |
| 1.14 | 65.50 | 71.50 | 93.47 | 99.90 |
| 1.44 | 74.40 | 78.10 | 95.65 | 99.90 |
| 1.88 | 82.10 | 83.10 | 97.45 | 100.00 |
| 2.57 | 88.60 | 88.30 | 99.00 | 100.00 |
| 3.46 | 93.50 | 93.20 | 99.74 | 100.00 |
| 4.69 | 97.20 | 95.50 | 99.90 | 100.00 |
| 6.20 | 98.10 | 96.30 | 99.99 | 100.00 |
| 8.37 | 99.10 | 97.20 | 100.00 | 100.00 |

Figure 10:
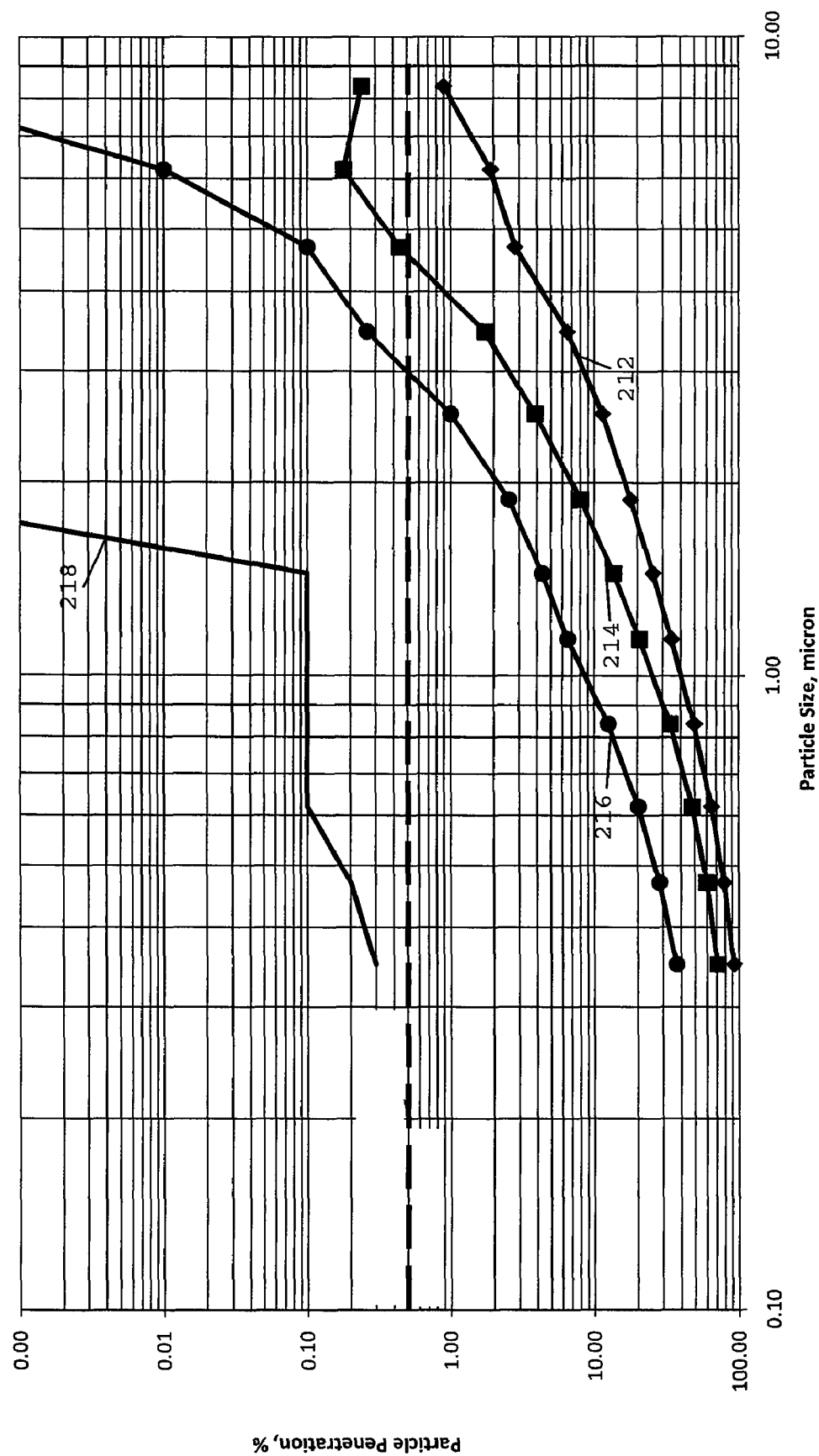
FIG. 10 is a graph of particulate penetration percentage versus particle size of the various media of FIG. 9 in comparison with an example of FIG. 1.

FIG. 10 shows a graph of a Particulate Penetration Curve. This graph is formed using the same data as FIG. 9, except that the filtration efficiency has been subtracted from 100% and a logarithmic scale is used on the y-axis to illustrate the improved performance of an example media of the subject invention. Thus, the particulate penetration data represents the percentage of particles that pass through a filter. The data for FIG. 10 is based on Chart 2. In FIG. 10, line 212 represents the standard 80/20 cellulose blend. Line 214 represents the standard synthetic, which refers to a wet-laid synthetic. Line 216 represents the standard synthetic nanomedia which refers to a wet-laid synthetic with a basis weight of less than 0.5 g/m² and a single-layer nanofiber layer that has a thickness of less than 0.5 microns. Line 218 represents an example of the subject invention with the surface layer 20 formed from a microporous ePFTE membrane. The data shown illustrates that line 218 filter submicron particulate better than other medias commonly used in industry at a large range of particle sizes, especially as smaller particle sizes are being tested.

CHART 2

Particulate Penetration Curve based on Particle Size

| Particle Size | Standard 80/20 Cellulose Blend (212) | Standard Synthetic (214) | Standard Synthetic Nanomedia (216) | Invention (218) |
|---|---|---|---|---|
| 0.35 | 92.40 | 62.00 | 37.20 | 0.30 |
| 0.47 | 78.90 | 53.50 | 28.33 | 0.20 |
| 0.62 | 64.70 | 45.30 | 20.20 | 0.10 |
| 0.84 | 49.50 | 37.00 | 12.52 | 0.10 |
| 1.14 | 34.50 | 28.50 | 6.53 | 0.10 |
| 1.44 | 25.60 | 21.90 | 4.35 | 0.10 |
| 1.88 | 17.90 | 16.90 | 2.55 | 0.00 |
| 2.57 | 11.40 | 11.70 | 1.00 | 0.00 |
| 3.46 | 6.50 | 6.80 | 0.26 | 0.00 |

CHART 2-continued

Particulate Penetration Curve based on Particle Size

| Particle Size | Standard 80/20 Cellulose Blend (212) | Standard Synthetic (214) | Standard Synthetic Nanomedia (216) | Invention (218) |
|---|---|---|---|---|
| 4.69 | 2.80 | 4.50 | 0.10 | 0.00 |
| 6.20 | 1.90 | 3.70 | 0.01 | 0.00 |
| 8.37 | 0.90 | 2.80 | 0.00 | 0.00 |

Figure 11:
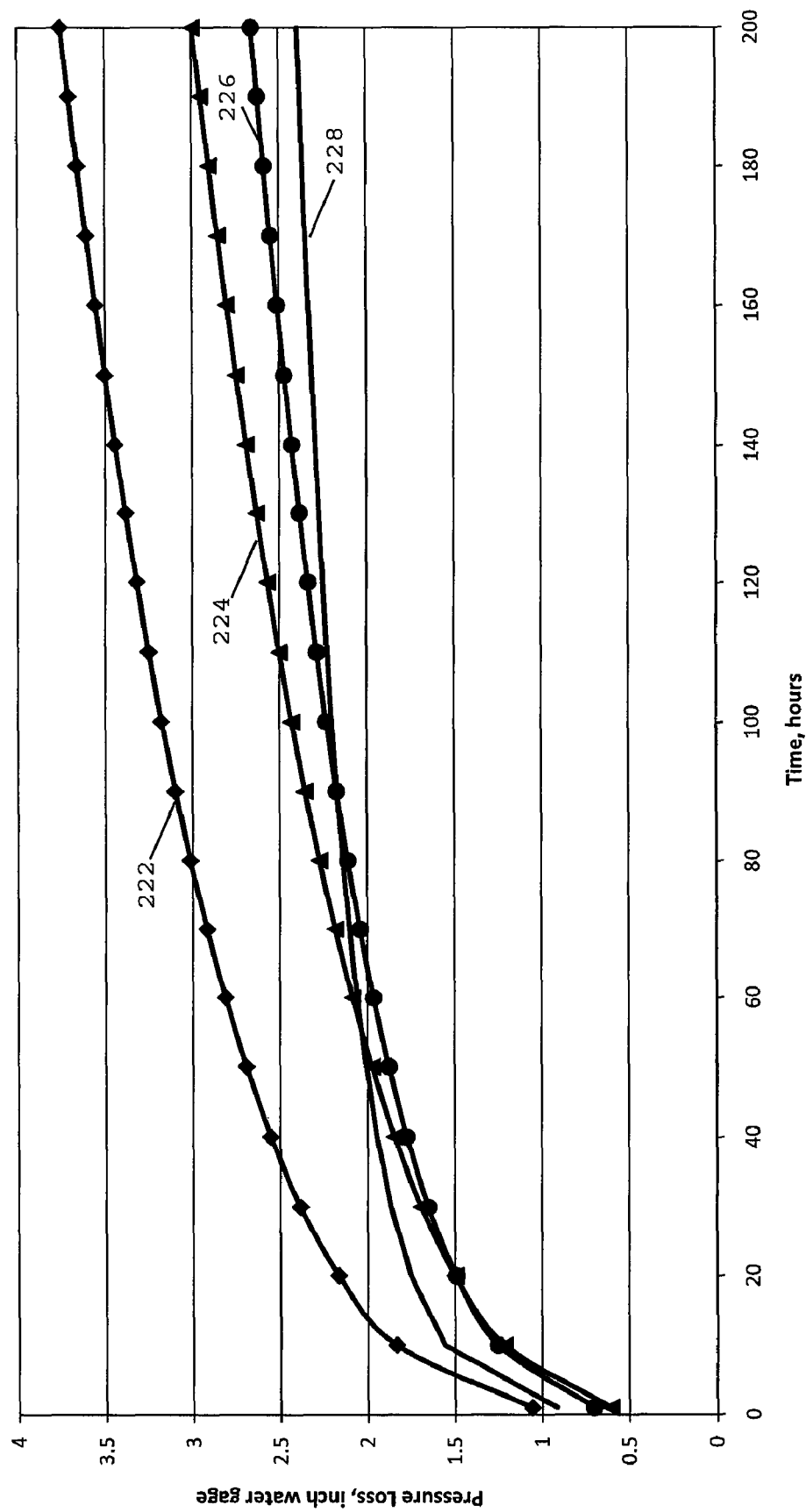
FIG. 11 is a graph of the pressure loss over a number of hours in a high dust loading environment for the various media of FIG. 9 in comparison with an example of FIG. 1.

FIG. 11 shows a graphical representation of a High Dust Loading Challenge. This graph illustrates the expected performance of the filters over their usable life. The pressure drop of the HEPA media increases at a slower rate in comparison to the traditional depth loading media, which is advantageous. Minimizing the change in operational pressure drop is critical to maintaining a constant output to the power system industry. In FIG. 11, line 222 represents the standard 80/20 cellulose blend. Line 224 represents the standard synthetic, which refers to a wet-laid synthetic. Line 226 represents the standard synthetic nanomedia which refers to a wet-laid synthetic with a basis weight of less than 0.5 g/m² and a single-layer nanofiber layer that has a thickness of less than 0.5 microns. Line 228 represents an example of the subject invention with the surface layer 20 formed from a microporous ePFTE membrane. The High Dust Loading Challenge simulates extreme conditions. Line 228, representing the subject invention, has an increased pressure drop at the initial time of the test but provides a reduced pressure increase over the life of the filter. The reduced pressure drop helps to save energy and can provide a direct cost savings in a plant application. The difference between the nanomedia line 226 and the ePTFE membrane line 228 is also illustrated in the High Dust Loading Challenge shown in FIG. 11. After both media are stabilized with dust over time, the nanomedia line 226 shows a slight continuous rise in pressure loss. In contrast, the ePTFE membrane line 228 has a relatively flat increase in slope over time. Thus, the ePTFE membrane performs better over increased periods of time and does not suffer from deterioration in performance.

The unique construction of the filter media 10 is more durable than known filter media and provides for lower pressure drop build-up because of less deflection from the forces exerted on the filter media during the filtering and reverse cleaning operations in part due to the corrugation construction. The filter elements 70 can produce an average efficiency greater than greater than 95% and equal to or less than 99.5% capture of the average most penetrating particle size of aerosol or dust (about 0.5 to about 1.25 microns) as compared to about 50-55% of known filter elements.

The ePTFE membrane provides improved performance over other known filters, such as the nanofiber. For example, both the nanofiber and the ePTFE membrane practice the art of surface filtration. The pore structure of a nanomedia can be approximately 8 to 10 microns. Thus, the nanomedia will still allow a small level of fine particulate dust to embed in the filtration surface. However, the ePTFE membrane will be an order of magnitude better, as its pore structure is approximately 0.5-1.25 microns. The ePTFE membrane can be a solid sheet that is stretched to obtain the desired pore size. Given the sub-micron pore structure of the ePTFE there is almost no fine particulate that embeds in to the membrane structure. Thus, the ePTFE membrane provides even more of a true surface filtration and combined with the unique low coefficient of friction properties or nonstick of the ePTFE membrane, dust is removed much more effectively as the media is cleaned. In other words, the dust is filtered at the surface of the filter media composite and the dust filtration is optimized such that the dust is removed effectively when demanded so the pressure drop still remains relatively low and remains relatively low during continual use of the filter. The media with the ePTFE membrane is designed to hold and filter as much dust as possible at the lowest pressure drop and a depth filter will not be needed or cleaned in use. In one instance, over 7 kg of dust at 4" wg (water gage).

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

The invention claimed is:

1. A composite filter media structure including:
   a base substrate including a nonwoven fabric substrate formed from a plurality of bicomponent synthetic fibers using a spunbond process;
   a surface layer deposited on one side of the base substrate wherein the surface layer is formed from a microporous expanded polytetrafluoroethylene membrane;
   the base substrate and the surface layer are configured to provide greater than 95% and equal to or less than 99.5% filtration efficiency measured in accordance with an EN 1822 test method, and the composite filter media structure provides the greater than 95% and equal to or less than 99.5% fractional efficiency at pressure drops between approximately 0.60 inches of water and 3.05 inches of water.

2. A composite filter media structure according to claim 1, wherein the surface layer has a basis weight of about 2.00 g/m² to about 3.50 g/m².

3. A composite filter media structure according to claim 1, wherein a thickness of the surface layer is approximately 5 to 25 microns.

4. A composite filter media structure according to claim 1, wherein the composite filter media structure captures particle sizes of about 0.3 to about 1.25 microns.

5. A composite filter media structure according to claim 1, wherein the composite filter media structure further including a plurality of corrugations.

6. A composite filter media structure according to claim 1, wherein the air permeability of the composite filter media structure is between about 4.0 cubic feet per minute and about 10.0 cubic feet per minute at 0.5 inches of water pressure.

7. A gas turbine air inlet filter element including:
   a first end cap;
   a second end cap; and
   a filter media, said filter media including:
      a nonwoven synthetic fabric formed from a plurality of bicomponent synthetic fibers with a spunbond process;
      a surface layer deposited on one side of the base substrate wherein the surface layer is formed from a microporous expanded polytetrafluoroethylene membrane;
      wherein the base substrate and the surface layer are configured to provide greater than 95% and equal to or less than 99.5% filtration efficiency measured in accordance with an EN 1822 test method;
      wherein said filter media further including an embossing pattern or a plurality of corrugations, said embossing pattern or said corrugations formed using opposing rollers at a temperature of about 90° C. to about 140° C.; and the composite filter media structure provides the greater than 95% and equal to or less than 99.5% fractional efficiency at pressure drops between approximately 0.60 inches of water and 3.05 inches of water.

8. A composite filter media structure according to claim 7, wherein the surface layer has a basis weight of about 2.00 g/m² to about 3.50 g/m².

9. A composite filter media structure according to claim 7, wherein a thickness of the surface layer is approximately 5 to 25 microns.

10. A filter element in accordance with claim 7, wherein said plurality of corrugations include a plurality of alternating peaks and valleys extending a length of the composite filter media.

11. A filter element in accordance with claim 7, wherein said composite filter media structure includes a corrugation pitch of about 3 to about 10 corrugations per inch and an effective depth of at least about 0.02 inch.

12. A method of making a composite filter media, the method including:

forming a nonwoven fabric substrate formed from a plurality of bicomponent synthetic fibers using a spunbond process; and applying a surface layer of a microporous expanded polytetrafluoroethylene membrane on at least one side of the nonwoven fabric by thermal lamination to melt the synthetic fibers in to the surface layer to form the composite filter media such that the composite filter media has a filtration efficiency of greater than 95% and equal to or less than 99.5%, and the composite filter media structure provides the greater than 95% and equal to or less than 99.5% fractional efficiency at pressure drops between approximately 0.60 inches of water and 3.05 inches of water.

13. A method in accordance with claim 12, wherein the step of applying the surface layer includes applying the surface layer with a basis weight of about 2.00 g/m² to about 3.50 g/m².

14. A method in accordance with claim 12, wherein the step of applying the surface layer includes applying the surface layer with a thickness of approximately 5 to 25 microns.

15. A method in accordance with claim 12, wherein the air permeability of the surface layer before the thermal lamination is performed is between about 9.0 cubic feet per minute and about 12.0 cubic feet per minute at 0.5 inches of water pressure.

16. A method in accordance with claim 12, wherein the composite filter media structure captures the most penetrating particle sizes of about 0.3 to about 1.25 microns.

17. A method in accordance with claim 12, further including the step of corrugating the composite filter media structure.

* * * * *